US005502883A

United States Patent [19]

Ohmi et al.

[11] Patent Number: 5,502,883

[45] Date of Patent: Apr. 2, 1996

[54] METHOD OF TIGHTENING THREADED MEMBER

[75] Inventors: Tadahiro Ohmi, Sendai; Nobukazu Ikeda, Osaka; Ryosuke Dohi, Osaka; Kunio Nagai, Osaka; Eiji Ideta, Osaka; Koji Nishino, Osaka; Michio Yamaji, Osaka; Tsutomu Shinohara, Osaka; Naofumi Yasumoto, Osaka, all of Japan

[73] Assignee: Fujikin Incorporated, Osaka, Japan

[21] Appl. No.: 253,745

[22] Filed: Jun. 3, 1994

[30] Foreign Application Priority Data

Jun. 4, 1993 [JP] Japan ........ 5-134789

[51] Int. Cl.[6] ........ B23P 19/06

[52] U.S. Cl. ........ 29/407.02

[58] Field of Search ........ 29/407, 240, 456; 173/1, 181, 183; 73/862.23, 862.24

[56] References Cited

U.S. PATENT DOCUMENTS

| | | | |
|---|---|---|---|
| 4,104,780 | 8/1978 | Sigmund | 29/407 |
| 4,163,310 | 8/1979 | Sigmund | 29/407 |
| 4,226,014 | 10/1980 | Eshghy | 29/407 |
| 4,228,576 | 10/1980 | Eshghy | 29/407 |
| 4,235,006 | 11/1980 | Eshghy | 29/407 |
| 4,241,488 | 12/1980 | Eshghy | 29/407 |
| 4,246,685 | 1/1981 | Eshghy | 29/407 |
| 4,375,120 | 3/1983 | Sigmund | 29/407 |
| 4,375,121 | 3/1983 | Sigmund | 29/407 |
| 4,375,122 | 3/1983 | Sigmund | 29/407 |
| 5,105,519 | 4/1992 | Doniwa | 29/407 |

FOREIGN PATENT DOCUMENTS

| | | |
|---|---|---|
| 0285185 | 3/1988 | European Pat. Off. . |
| 0340999 | 4/1989 | European Pat. Off. . |
| 0480380 | 10/1991 | European Pat. Off. . |
| WO91/01198 | 2/1991 | WIPO . |

*Primary Examiner*—David P. Bryant
*Assistant Examiner*—Marc W. Butler
*Attorney, Agent, or Firm*—Armstrong, Westerman, Hattori, McLeland & Naughton

[57] ABSTRACT

A reference range of tightening torques is predetermined relative to the rotation angle of a threaded member as normally tightened. In tightening up a nut on an externally threaded member, the tightening torque is detected by a torque sensor every time the nut is rotated through a specified angle, and whether the tightening torque relative to the rotation angle is within the reference range is judged by a microcomputer. The result of judgment is indicated by a light-emitting diode and a buzzer.

9 Claims, 16 Drawing Sheets

FIG.14
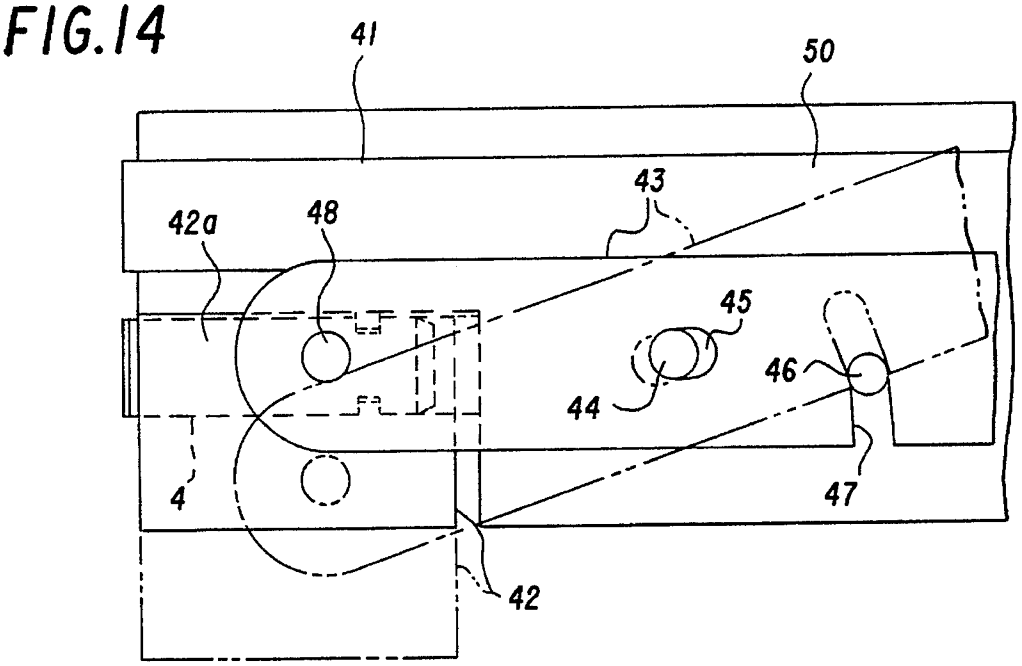
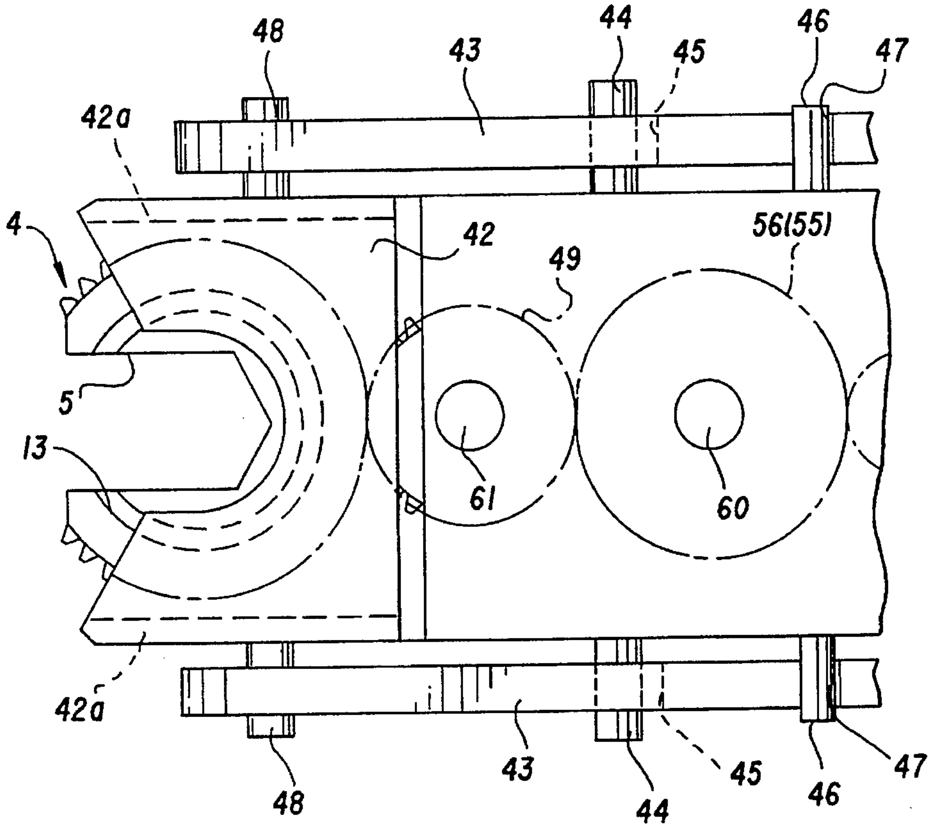
FIG.15

METHOD OF TIGHTENING THREADED MEMBER

BACKGROUND OF THE INVENTION

The present invention relates to a threaded member tightening method, for example, for use in fastening the components of a pipe joint together with a nut.

Pipe joints are already known which comprise a first tubular joint member having a hexagonal flange and an externally threaded portion, a second tubular joint member disposed end to end therewith, an annular gasket interposed between the opposed end faces of the two joint members, a nut provided on the second joint member and screwed on the first joint member and a thrust bearing provided between the second joint member and the nut.

With the pipe joint, a fluid-tight connection is provided by manually tightening the nut on the first joint member first and thereafter tightening up the nut with a tool with the hexagonal flange of the first joint member held with another tool. To tighten up the nut suitably, a mark is made on each of the first joint member and the nut after the nut has been manually tightened, and the nut is then turned through a required angle with reference to the marks. Alternatively, the nut is turned with a torque wrench serving as the tightening tool until a required torque value is obtained to ensure tightening.

Thus, the conventional methods of tightening treaded members necessitate the cumbersome procedure of turning the nut through the required angle by reference to the marks or turning the nut with the torque wrench to obtain the desired torque value.

While the worker is likely to forget to install the gasket or thrust bearing when assembling the pipe joint, the conventional methods described are unable to indicate the absence of the gasket or thrust bearing, giving rise to the problem of a leak from the joint portion of piping due to improper tightening.

SUMMARY OF THE INVENTION

The main object of the present invention is to provide a threaded member tightening method which facilitates the procedure for tightening pipe joints and the like and reliably precludes improper tightening.

The present invention provides a method of tightening a threaded member while detecting the amount of tightening and the tightening torque and judging whether the tightening torque is within a reference range relative to the amount of tightening, the reference range of tightening torques being predetermined relative to the amount of tightening of the threaded member as normally tightened.

The amount of tightening of the threaded member to be used is the angle of rotation of the threaded member or the displacement of the threaded member. The reference value of tightening torque to be used is the value of tightening torque or the slope of the tightening torque relative to the amount of tightening of the threaded member. In an aspect of the present invention, a motor is used as drive means for tightening the threaded member, and the rotation angle of the threaded member is calculated from the rotation time of the motor, and the value of tightening torque from the current value of the motor.

The threaded member tightening method of the present invention precludes overtighening or under-tightening without the need for the worker to check whether the threaded member is normally tightened, further enabling the worker to recognize that he has forgotten to install a gasket or thrust bearing, for example, into a pipe joint. This ensures a facilitated tightening procedure and obviates any likelihood of improper tightening.

BRIEF DESCRIPTION OF THE DRAWINGS

FIG. 14 is a fragmentary side elevation of the same;

FIG. 15 is a fragmentary plan view of the same;

DESCRIPTION OF PREFERRED EMBODIMENTS

Embodiments of the present invention will be described below with reference to the drawings.

Figure 1:
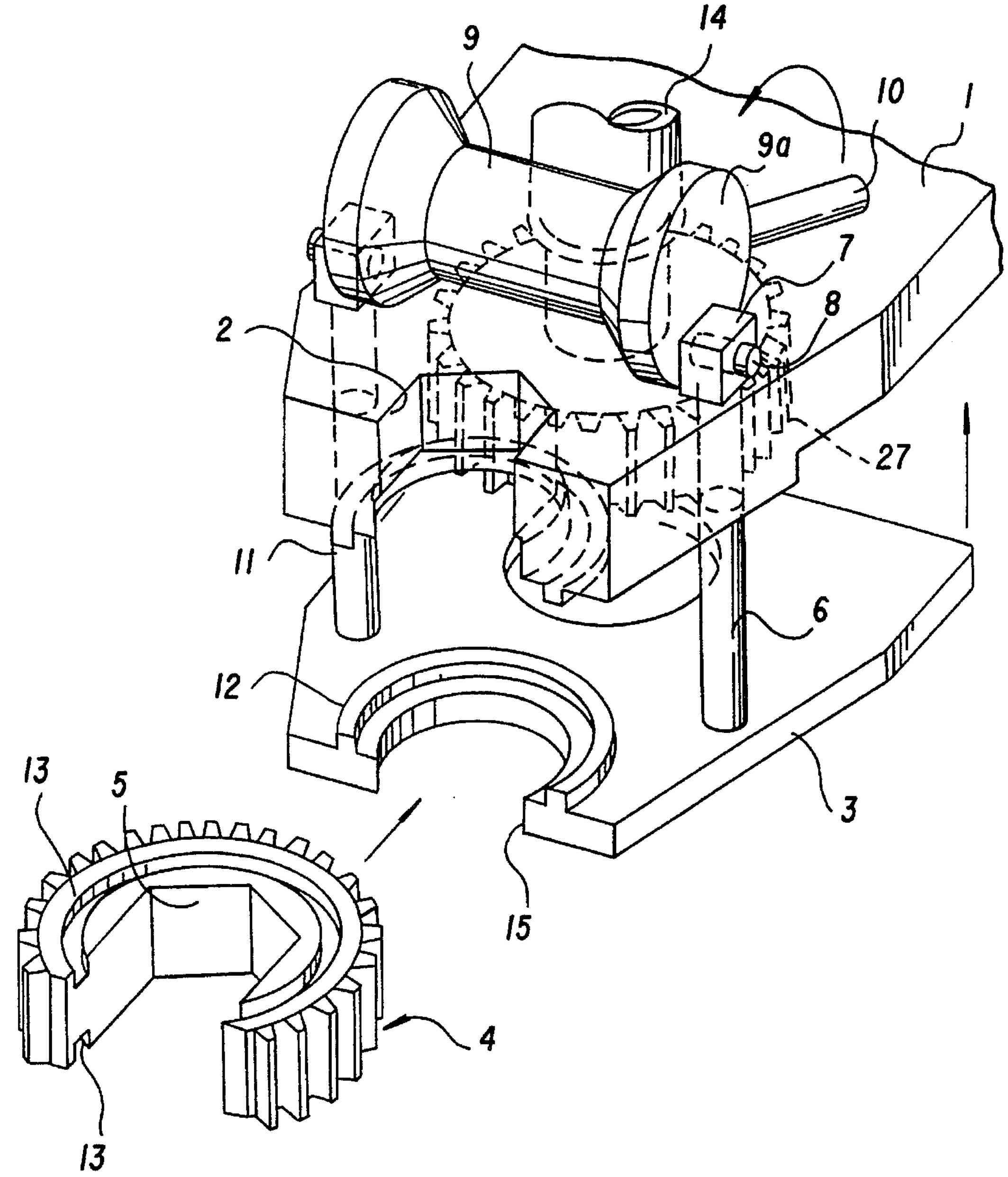
FIG. 1 is an exploded fragmentary perspective view of an embodiment of tightening device for use in a threaded member tightening method of the invention.
Figure 2:
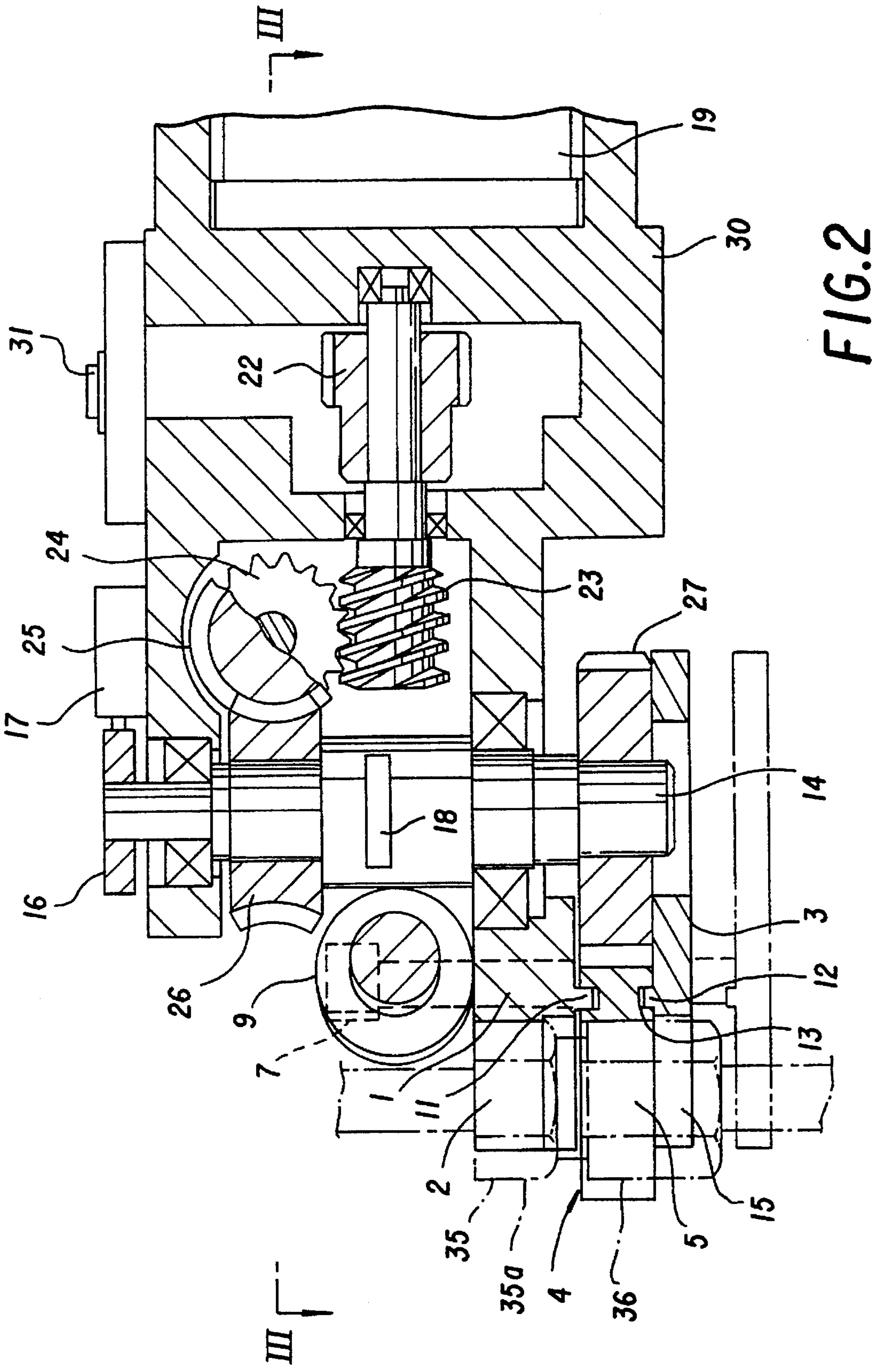
FIG. 2 is a view in vertical section of the same.
Figure 3:
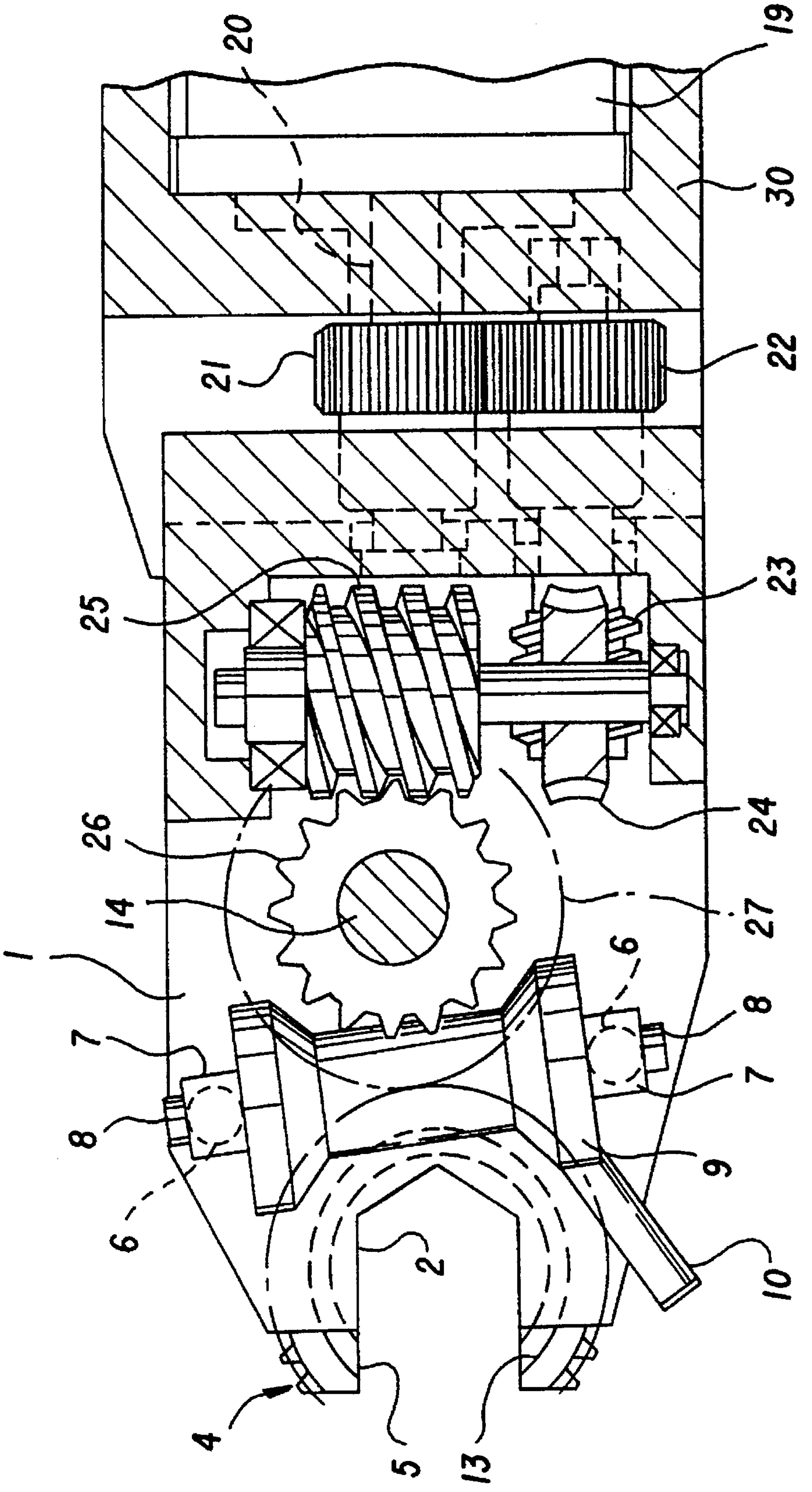
FIG. 3 is a view in section taken along the line III—III in FIG. 2.

In the specification, the terms "upper" and "lower" will be used with reference to the state shown in FIG. 2, whereas the up-down relationship is relative; the illustrated device may be used with the upper side positioned down, laterally or obliquely. The term "front" refers to the left-hand side of FIG. 2, and the term "rear" to the right-hand side of FIG. 2.

FIGS. 1 to 7 show an electric motor-driven tightening device for use in the threaded member tightening method of the present invention.

The device is adapted to fully tighten a nut 36 manually tightened on an externally threaded member 35 having a flange 35a. The device comprises an upper plate 1 adapted to prevent the externally threaded member from rotation and projecting forward from the front end of a body 30 housing a d.c. servomotor 19, a gear supporting lower plate 3 disposed under the upper plate 1 in parallel thereto and movable upward and downward, a nut rotating gear 4 mounted on the front end of the lower plate 3 and rotatable in a horizontal plane, and a drive spur gear 27 interposed between the upper plate 1 and the lower plate 3 and meshing with the gear 4 for rotating the gear.

The upper plate 1 is formed at its front end with a flange fitting portion 2 which is open toward the front. The flange fitting portion 2, which corresponds to the head of a spanner, has an opening width in conformity with the external size of the flange 35a of the externally threaded member 35. The threaded member 35 is prevented from rotation when the flange 35a thereof is fitted into the portion 2.

The lower plate 3 is formed at its front end with a nut fitting portion 15 coaxial with the flange fitting portion 2 and open toward the front. The nut fitting portion 15 is partly circular and slightly larger than the nut 36 in cross sectional area so as not to prevent rotation of the nut 36.

The front end of the lower plate 3 is provided on its upper surface with a circular-arc upward projection 12 coaxial with the flange fitting portion 2, while the front end of the upper plate 1 is formed on its lower surface with a circular-arc downward projection 11 coaxial with the flange fitting portion 2.

The nut rotating gear 4 is a spur gear having a portion 5 for the nut 36 to fit in. With the gear 4 supported on the lower plate 3, the nut fitting portion 5 is coaxial with the flange fitting portion 2. The portion 5 is open toward the front to removably fit the nut 36 thereinto and has an opening size in conformity with the external size of the nut 36. The gear 4 is formed in its upper and lower sides with upper and lower grooves 13 for the downward projection 11 of the upper plate 1 and the upward projection 12 of the lower plate 3 to fit in, respectively.

The gear 4 is rotated counterclockwise when seen from above by being driven by the spur gear 27 meshing therewith. The spur gear 27 in mesh with the nut rotating gear 4 is mounted on and rotatable with a vertical rotary shaft 14 extending through the upper plate 1 close to the front end thereof.

The lower plate 3 has two vertical guide rods 6 each extending through the upper plate 1. Each rod has an upper end fixedly provided with a rectangular parallelepipedal block 7, and a lower end fixed to the lower plate 3. A cylindrical eccentric roller 9 having an outer flange 9a at each end is disposed on the upper surface of the upper plate 1. The eccentric roller 9 is rotatably attached to the block 7 by a pin 8 at an eccentric position on each flange 9a. The roller 9 has a lever 10 attached thereto. When moved, the lever 10 rotates the roller 9 to move the lower plate 3 upward or downward relative to the upper plate 1 while there plates 1, 3 are being held in parallel.

The eccentric roller 9 rotates as always held in contact with the upper surface of the upper plate 1 by gravity acting on the roller 9 itself and on the lower plate 3 and vertical guide rods 6 connected thereto. When the pins 8 are in the highest position, the upper surface of the lower plate 3 is in contact with the lower surface of the spur gear 27, with the nut rotating gear 4 meshing with the hear 27 for rotating the gear 4. In this state, the projections 11, 12 of the upper and lower plates 1, 3 are fitted in the respective upper and lower circular-arc grooves 13, 13 of the gear 4, rendering the gear 4 rotatable about a vertical axis immediately below the flange fitting portion 2 of the upper plate 1 by being guided by the two projections 11, 12. A small clearance is formed between the upper surface of the lower plate 3 and the lower surface of the upper plate 1 and between the bottom face of the groove 13 of the gear 4 and the lower face of the projection 11 of the upper plate 1 so that the gear 4 is movable upward or downward (see FIG. 2, 5 and 6, (*a*)).

Figure 6C:
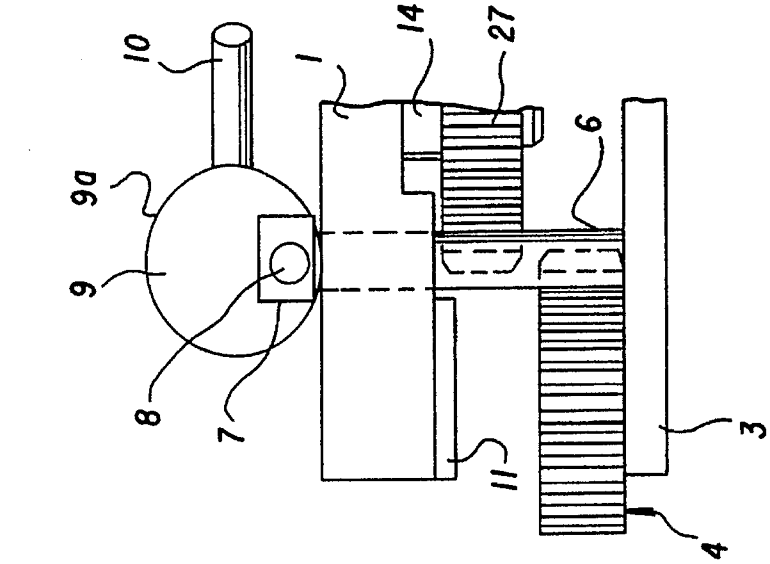
FIG. 6, (*a*), (*b*), and (*c*) are side elevations showing an eccentric roller and a lower plate in operation.
Figure 6B:
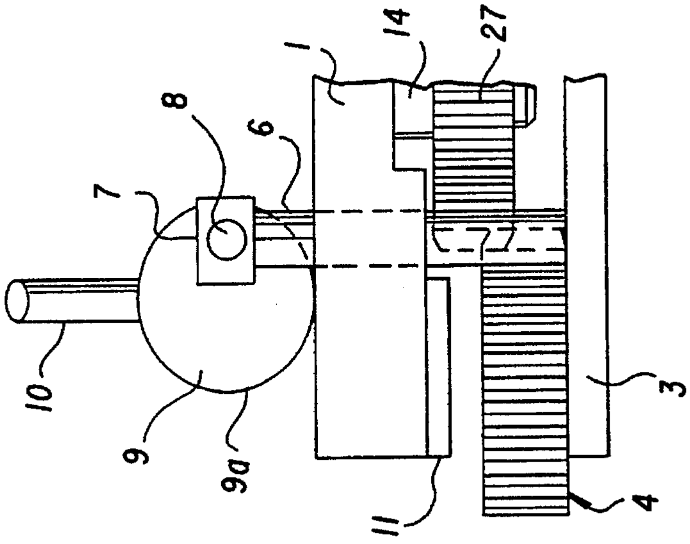
Figure 6A:
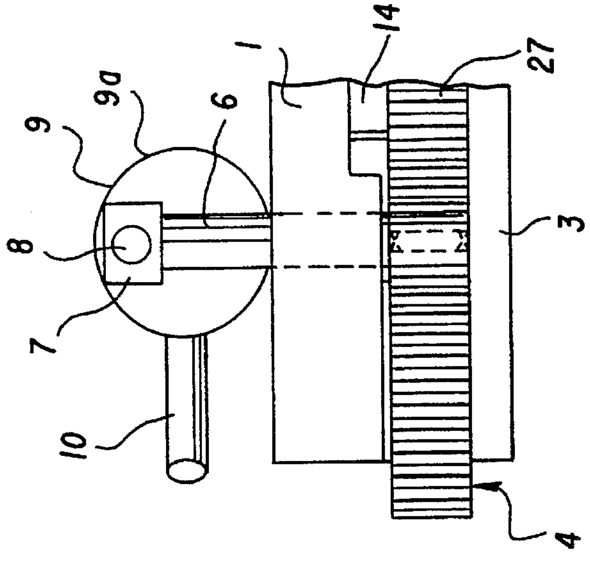

When the eccentric roller 9 is rotated through 90 deg from the above position, the nut rotating gear 4 is brought to a position where it is in mesh with the spur gear 27 only slightly (see FIG. 6, (*b*)). When the roller 9 further rotates through 90 deg from this position, bringing the pins 8 to the lowest position, the lower plate 3 is away from the upper plate 1 by the largest distance, with the gear 4 brought out of meshing engagement with the spur gear 27 for driving the gear 4 (see FIG. 6, (*c*)).

The vertical rotary shaft 14 carrying the drive spur gear 27 for the nut rotating gear 4 is rotated by the d.c. servomotor 19 and a train of gears. More specifically, the servomotor 19 has a drive shaft 20 which is rotatable clockwise when seen from the rear toward the front and which carries a spur gear 21. Meshing with this gear 21 is another spur gear 22 having a horizontal rotary shaft in parallel with the shaft 20. A worm 23 mounted on the shaft of the spur gear 22 is in mesh with a worm wheel 24 having a horizontal rotary shaft, which is provided with another worm 25. A worm wheel 26 meshing with the worm 25 is attached to the vertical rotary shaft 14.

Figure 4:
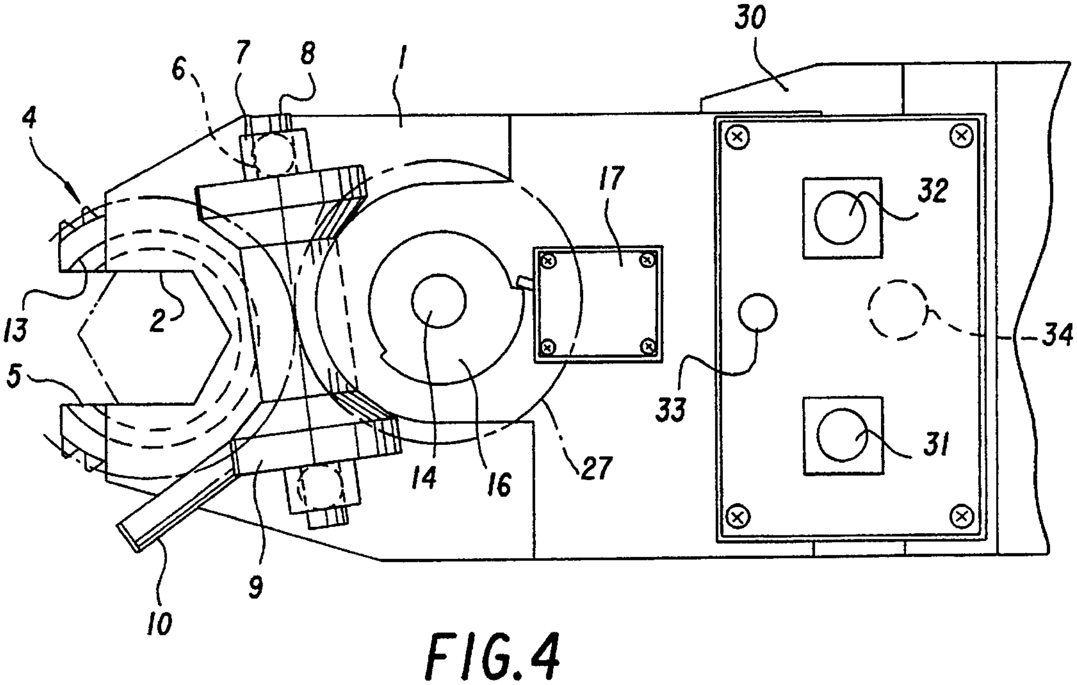
FIG. 4 is a fragmentary plan view showing the tightening device of FIG. 1.
Figure 5:
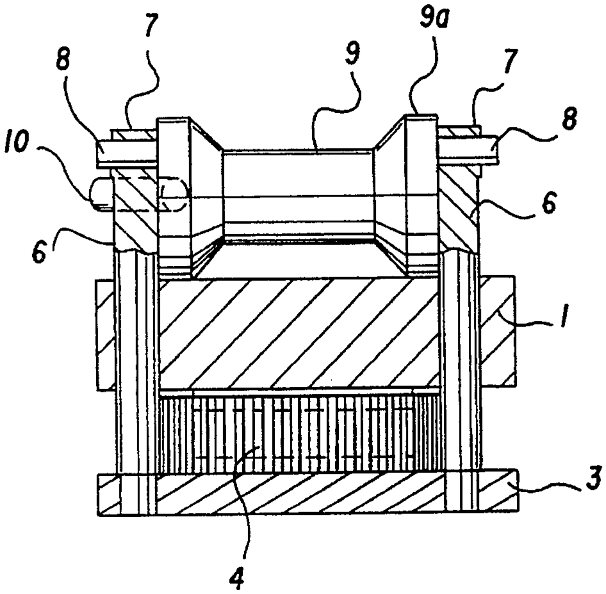
FIG. 5 is a view in cross section of the same.

The train of gears described is housed in the body 30. As seen in FIG. 4, provided on the top of the body 30 are a start button 31, emergency stop button 32, light-emitting diode 33 and alarm buzzer 34.

The vertical rotary shaft 14 is provided at its upper end with a rotary plate 16 rotatable therewith for use in counting the number of revolutions of the shaft 14 by a rotation angle sensor 17, which converts the number to an angle of rotation of the nut. A strain gauge 18 is affixed to the peripheral surface of the rotary shaft 14, and the amount of strain of the shaft 14 is converted to a fastening torque by a fastening torque sensor 28.

The nut 36 is tightened on the externally threaded member 35 by the above device in the following manner.

First, the nut 36 is tightened on the threaded member 35 manually. The lower plate 3 is positioned at the largest distance from the upper plate 1. Next, the flange fitting portion 2 of the upper plate 1 is fitted to the flange 35a of the threaded member 35, and the nut 36 is positioned above the nut fitting portion 15. The nut rotating gear 4 is then placed on the lower plate 3 with the nut fitting portion 5 fitted to the nut 36. The eccentric roller 9 is thereafter rotated to move the lower plate 3 toward the upper plate 1 and mesh the gear 4 with the drive spur gear 27 while finely adjusting the gear 4 manually, whereby the device is made ready for operation. The start button 31 is then pressed. The nut 36 is automatically tightened up completely with judgment made as to whether it is tightened normally.

Figure 7:
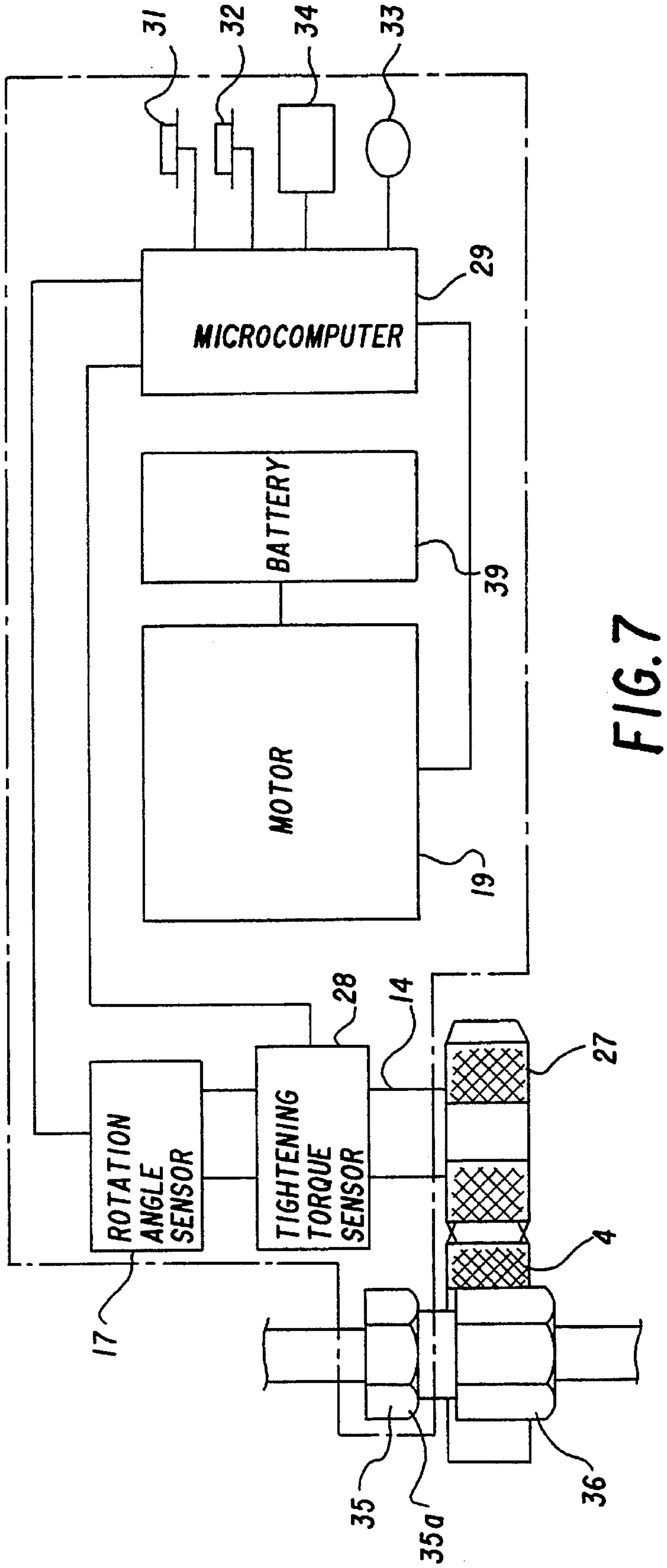
FIG. 7 is a block diagram showing an embodiment of tightening judging means for use in the method of the invention.

With reference to the block diagram of FIG. 7, the tightening torque detected by the torque sensor 28 and the rotation angle detected by the torque sensor 28 and the rotation angle detected by the angle sensor 17 are fed to a microcomputer 29, which judges whether the nut is tightened normally by the judging procedure to be described below. The result is output from the light-emitting diode 33 and the alarm buzzer 34. The microcomputer 29 feeds to the servomotor 19 a command, for example, as to the rotation speed or angle, reverse rotation or stopping of the nut 36.

The diode 33 presents, for example, green light indicating normal tightening or red light indicating abnormal tightening, or is turned on when made ready for checking, turned off to indicate normal tightening or flickered to indicate abnormal tightening. The alarm buzzer 34 goes on, for example, once to indicate normal tightening or three times to indicate abnormal tightening.

Figure 8:
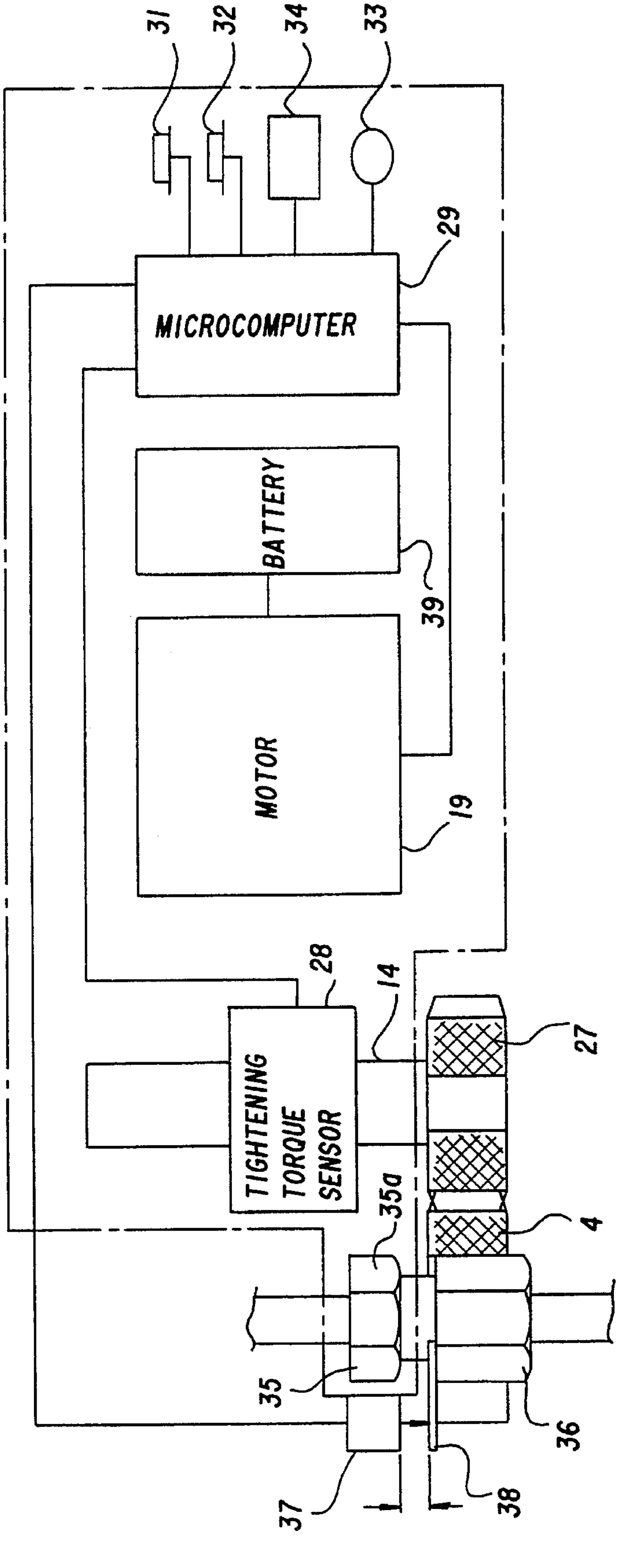
FIG. 8 is a block diagram of another embodiment of the same.

FIG. 8 is a block diagram showing judging means which is adapted to detect the amount of tightening of the nut 36 in terms of the displacement of the nut 36 relative to the externally threaded member 35 instead of the angle of rotation. In this case, the threaded member 35 is provided, for example, with a displacement sensor 37 of the laser type, and a laser beam receiving member 38 is attached to the end face of the nut 36 opposed to the threaded member 35. The displacement sensor 37 may be provided on the nut 36.

Figure 9:
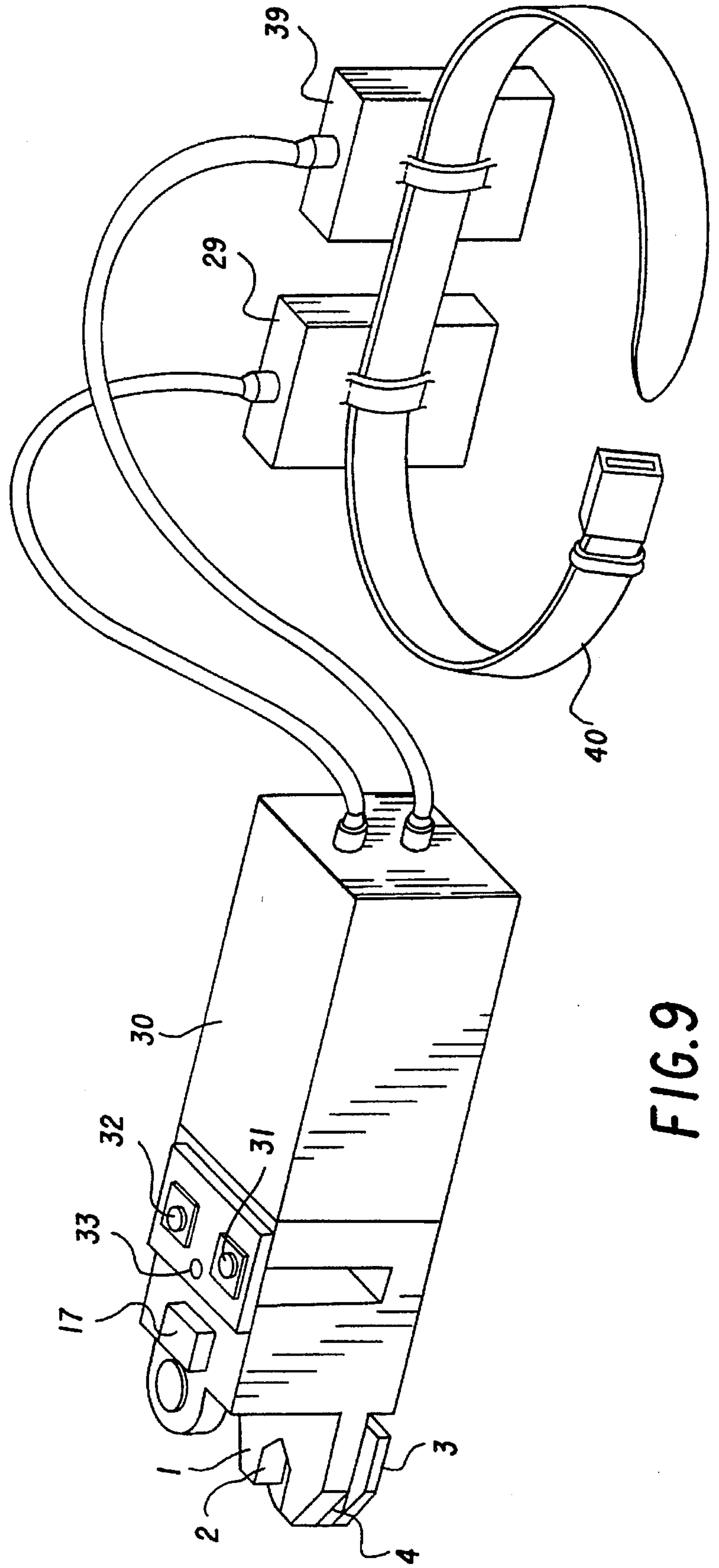
FIG. 9 is a perspective view schematically showing the tightening device of FIG. 1 in its entirety.

A motor drive battery 39 and the microcomputer 29 may be incorporated into the tightening device, or separated from the main body of the tightening device and attached, for example, to a band 40 as seen in FIG. 9. Alternatively, it is possible to provide the battery 39 and the microcomputer 29 as a unit, or to separate the battery 39 only from the tightening device wherein the microcomputer 29 is incorporated.

Figure 10:
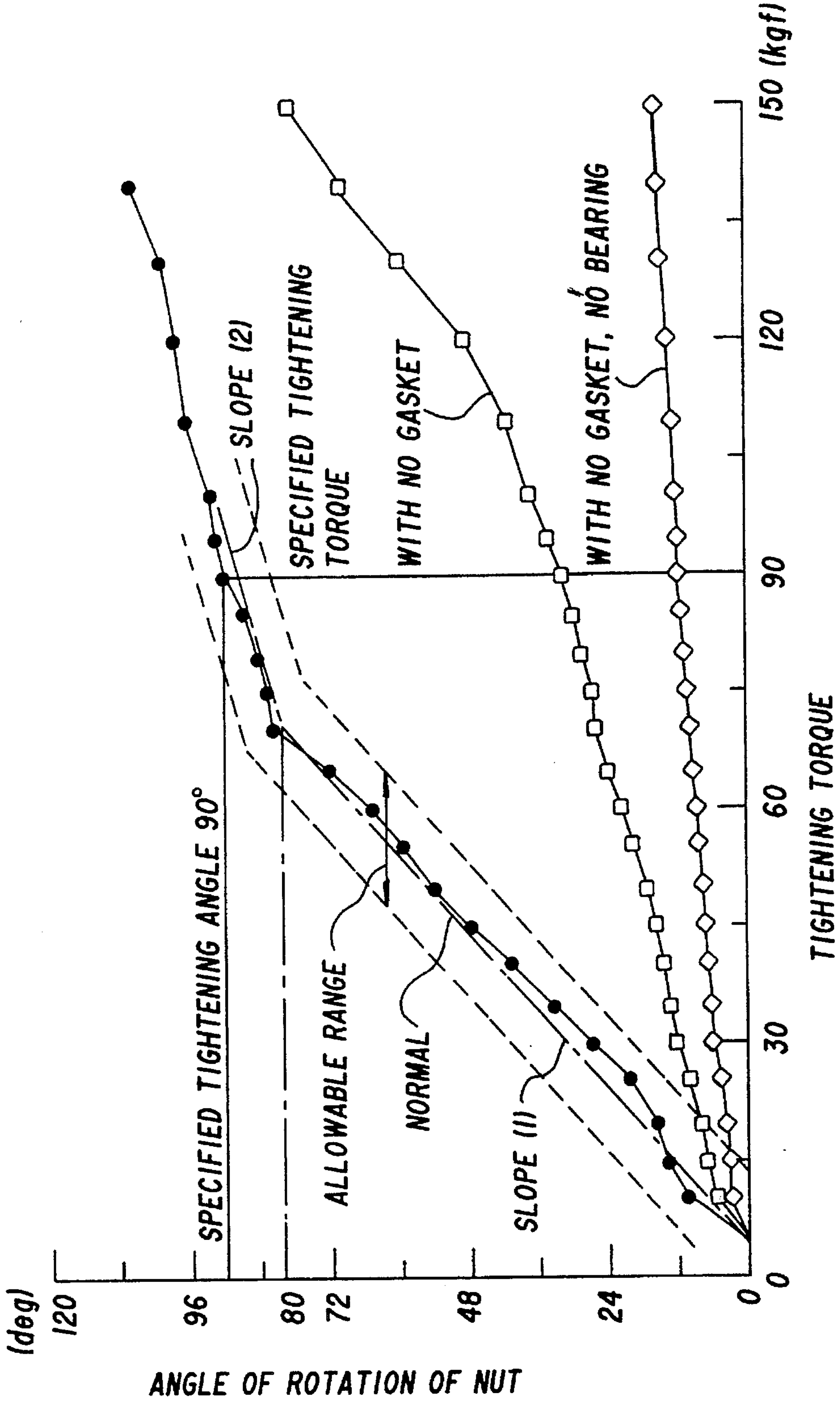
FIG. 10 is a graph showing the relationship between the angle of rotation of a nut and the tightening torque.

FIG. 10 shows the relationship between the tightening angle and the tightening torque involved in tightening up a pipe joint which comprises a first tubular joint member (externally threaded member) 35 having an externally threaded portion and a hexagonal flange, a second tubular joint member, an annular gasket interposed between opposed ends of the two joint members, a nut 36 provided on the second tubular joint member and screwed on the first tubular joint member (externally threaded member) 35, and a thrust bearing provided between the second joint member and the nut 36. The relationship was determined in a normal case and also in abnormal cases wherein the gasket, or both gasket and thrust bearing were absent while assembling the pipe joint by manually tightening the nut 36 on the threaded member 35 first and thereafter tightening up the nut 36 with a wrench. In the normal case shown in FIG. 10, the tightening torque increases in a linear relation (slope (1)) with the nut tightening angle as the nut 36 is tightened until the angle increases to about 80 deg. The slope alters at the nut tightening angle of about 80 deg, and the tightening torque thereafter increases in a linear relation (slope (2)). When the worker forgot to install the gasket, the increase in the tightening torque is greater than in the normal case to exhibit a different slope. When the worker forgot to install both the gasket and the thrust bearing, the tightening torque increases at a greater rate, exhibiting a slope different from the slope in the absence of the gasket only.

The results indicate that the value of tightening torque relative to the tightening angle and the slope (gradient) of tightening torque are each usable as a reference value in judging tightening.

Figure 11:
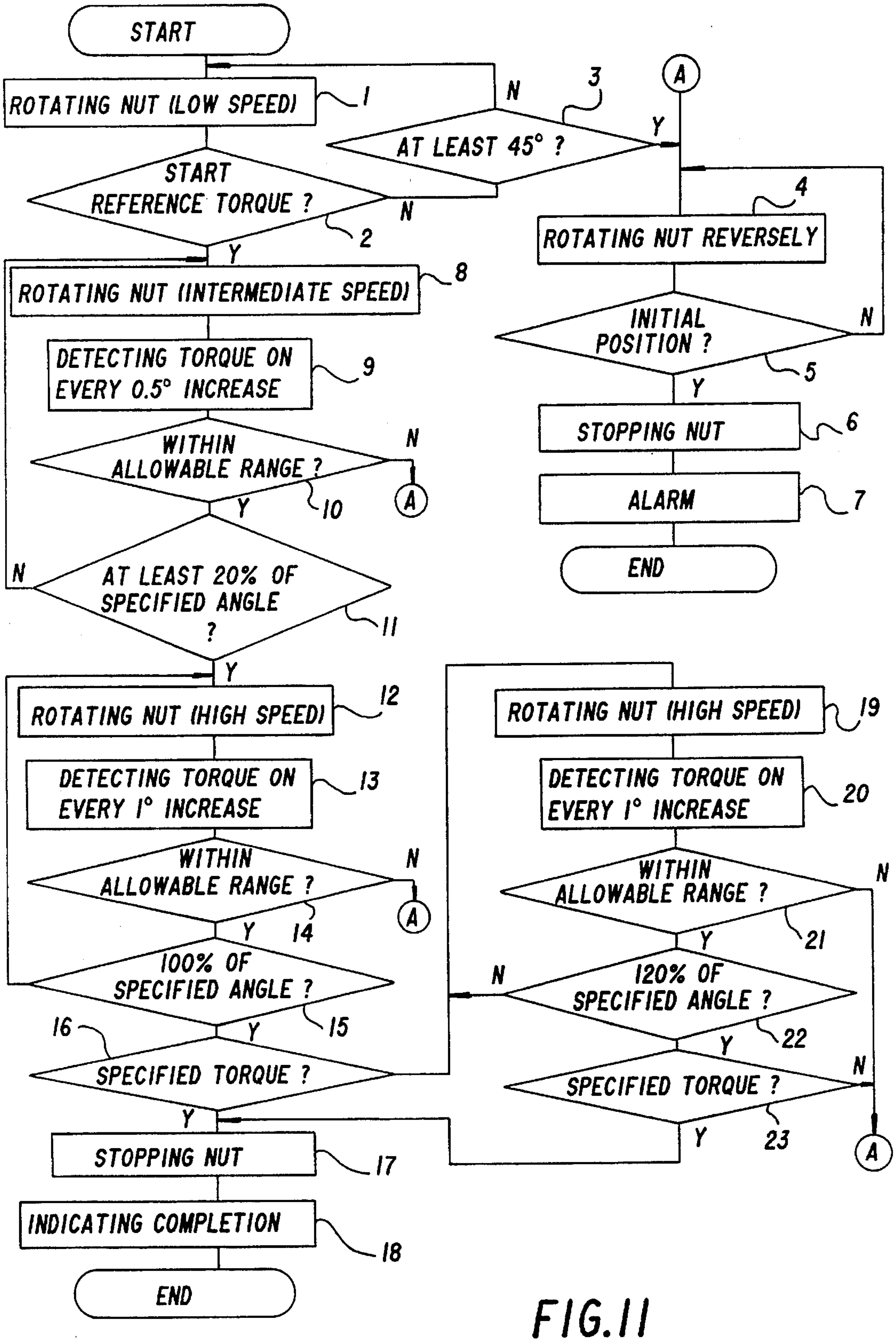
FIG. 11 is a flow chart generally showing a tightening method wherein the rotation angle of the nut and tightening torque are detected.

Next, an example of tightening method will be described with reference to the flow chart of FIG. 11.

The nut 36 is manually tightened on the externally threaded member 35 in advance, followed by tightening by the tightening device. In the beginning, the nut is rotated at a low speed (step 1), and an inquiry is made as to whether the tightening torque has reached a tightening start reference torque (step 2). If the answer to the inquiry is negative, whether the amount of rotation of the nut is at least 45 deg is checked (step 3). If it is less than 45 deg, step 3 is followed by step 1 again. When the amount is found to be at least 45 deg in step 3, this is interpreted as indicating improper tightening due to manual under-tightening, and the sequence proceeds to step 4. The nut is reversely rotated in step 4 and then checked as to whether the nut is returned to the initial position (step 5). If the nut is in the initial position, the reverse rotation of the nut is discontinued (step 6), whereupon an alarm indicating improper tightening is given to terminate the tightening operation (step 7). When the answer to the inquiry of step 2 is affirmative, the nut is rotated at a higher speed (step 8), and the tightening torque is detected every time the amount of rotation of the nut increases by 0.5 deg (step 9), and then checked as to whether the torque is within an allowable range (step 10). If the tightening torque is not within the allowable range, the result is interpreted as indicating improper tightening, whereupon step 4 follows. When the tightening torque is found to be within the allowable range in step 10, an inquiry is made as to whether the rotation angle of the nut is at least 20% of the specified angle of rotation (step 11). If the answer to step 11 is negative, the sequence returns to step 8. When the answer to the inquiry of step 11 is in the affirmative, the nut is rotated at a further increased speed (step 12), and the tightening torque is detected every time the amount of rotation of the nut increases by 1 deg (step 13). An inquiry is made again as to whether the tightening torque is within an allowable range (step 14). If the answer to step 14 is negative, the result is interpreted as indicating improper tightening, and step 4 follows. When the answer to step 14 is affirmative, an inquiry is made as to whether the rotation angle of the nut has reached 100% of the specified tightening angle (step 15). If the answer to the inquiry of step 15 is negative, the sequence returns to step 12. If the answer is affirmative, whether the tightening torque has reached the specified tightening torque is inquired (step 16). When the answer to the inquiry is in the affirmative, this is interpreted as indicating that the tightened nut is acceptable, and the rotation of nut is stopped (step 17), whereupon completion of proper tightening is indicated (step 18). If the answer to the inquiry of step 16 is negative, the nut is further rotated (step 19), and the tightening torque is detected every time the amount of rotation of the nut increases by 1 deg (step 20) and checked as to whether the torque is within an allowable range (step 21). When the answer to the inquiry of step 21 is in the negative, the result is interpreted as indicating improper tightening, and step 4 follows. When the answer to the inquiry of step 21 is affirmative, an inquiry is made as to whether the rotation angle of the nut has reached 120% of the specified tightening angle (step 22). If the answer to this inquiry is negative, step 19 follows. When the answer to the inquiry of step 22 is affirmative, an inquiry is made as to whether the tightening torque has reached the specified tightening torque (step 23). When the answer to the inquiry of step 23 is negative, the result is interpreted as indicating improper tightening, followed by step 4. When the answer to the inquiry of step 23 is affirmative, the result is interpreted as indicating acceptable tightening, and the sequence proceeds to step 17.

Figure 12:
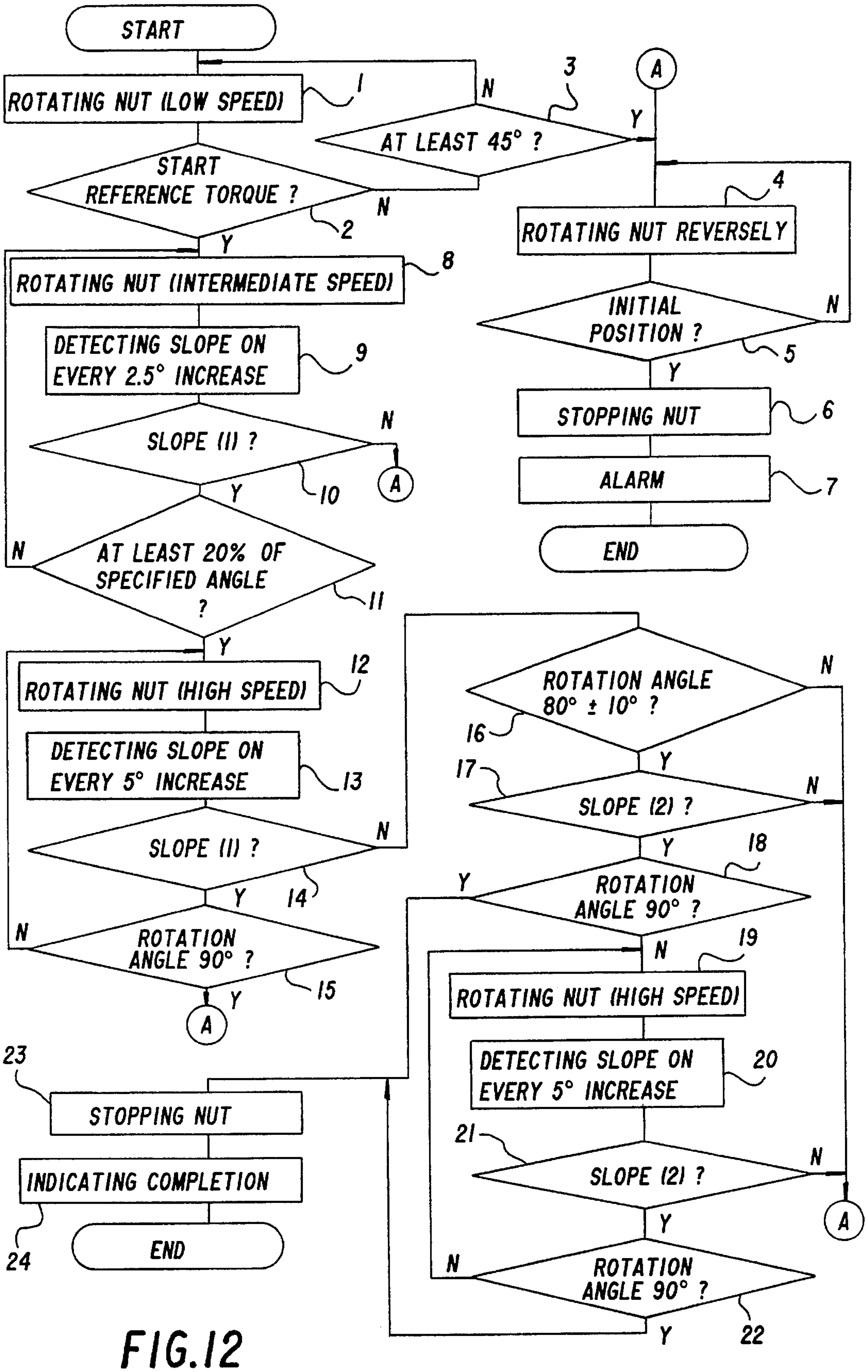
FIG. 12 is a flow chart generally showing a tightening method wherein the angle of rotation of the nut and the slope of tightening torque are detected.

Next with reference to the flow chart of FIG. 12, another tightening method will be described wherein the slope of tightening torque is used for judgment.

With the nut tightened manually in advance, tightening by the tightening device is started. In the beginning, the nut is rotated at a low speed (step 1), and an inquiry is made as to whether the tightening torque has reached a tightening start reference torque (step 2). If the answer to the inquiry is negative, whether the amount of rotation of the nut is at least 45 deg is checked (step 3). If it is less than 45 deg, step 3 is followed by step 1 again. When the amount is found to be at least 45 deg in step 3, this is interpreted as indicting improper tightening due to manual under-tightening, and the sequence proceeds to step 4. The nut is reversely rotated in step 4 and then checked as to whether the nut is returned to the initial position (step 5). If the nut is in the initial position, the reverse rotation of the nut is discontinued (step 6), whereupon an alarm indicating improper tightening is given to terminate the tightening operation (step 7). When the answer to the inquiry of step 2 is affirmative, the nut is rotated at a higher speed (step 8), and the slope of tightening torque is detected every time the amount of rotation of the nut increases by 2.5 deg (step 9), and then checked as to whether the torque slope is within an allowable range (step 10). If the slope is not within the allowable range, the result is interpreted as indicting improper tightening, whereupon step 4 follows. When the tightening torque slope is found to be within the allowable range in step 10, an inquiry is made as to whether the rotation angle of the nut is at least 20% of the specified tightening angle (step 11). If the answer to step 11 is negative, the sequence returns to step 8. When the answer to the inquiry of step 11 is in the affirmative, the nut is rotated at a further increased speed (step 12), and the slope of tightening torque is detected every time the amount of rotation of the nut increases by 5 deg (step 13). An inquiry is made again as to whether the tightening torque slope is within an allowable range (step 14). If the answer to step 14 is affirmative, an inquiry is made as to whether the rotation angle of the nut has reached 90 deg (step 15). If the answer to the inquiry of step 15 is negative, the sequence returns to step 12. When the rotation angle of the nut is found to be at least 90 deg in step 15, the result is interpreted as indicating improper tightening, followed by step 4. If the answer to the inquiry of step 14 is negative, an inquiry is made in step 16 as to whether the rotation angle of the nut is within the range of 70 to 90 deg. When the answer is negative, this is interpreted as indicating improper tightening, and step 4 follows. When the answer is affirmative, an inquiry is made as to whether the torque slope is within an allowable range of slope (2) (step 17). When the answer to the inquiry of step 17 is negative, the result is interpreted as indicating improper tightening, and step 4 follows. If the answer to the inquiry of step 17 is affirmative, an inquiry is made as to whether the rotation angle of the nut has reached 90 deg (step 18). When the angel is found to be 90 deg in step 18, the result is interpreted as indicating acceptable tightening, and the nut is stopped (step 23), whereupon completion of proper tightening is indicated (step 24). If the answer to step 18 is negative, the nut is further rotated (step 19), and the tightening torque slope is detected every time the amount of rotation of the nut increases by 5 deg (step 20) and checked as to whether the slope is within an allowable range of slope (2) (step 21). When the answer to the inquiry of step 21 is in the negative, the result is interpreted as indicating improper tightening, and step 4 follows. When the answer to the inquiry of step 21 is affirmative, an inquiry is made as to whether the rotation angle of the nut has reached 90 deg (step 22). If the answer to the inquiry of step 22 is negative, step 19 follows. When the answer to the inquiry of step 22 is affirmative, the result is interpreted as indicating proper tightening, whereupon the sequence proceeds to step 23.

The allowable range in the foregoing embodiment is −10% to +10% of the tightening torque, serving as a full scale, at the specified tightening angle. The nut is rotated through an angle of 0 to 20% at about 50% of the rate for the rotation angle of 20 to 100%.

The numerical values, such as 20%, 90 deg and 1-deg increase, relating to the angle of rotation and mentioned above are all examples; suitable values of rotation angles and the like are set in the microcomputer 29 in accordance with the properties of the member to be tightened.

For starting tightening, a reference position is selected where the tightening torque is about 7 kgf-om. Even if a small tightening torque is produced by manual tighening due to a bent or shift in the piping or even in the event of insufficient manual tightening, the reference position for the start of tighening can then be free of the resulting influence.

Although proper tightening of the nut 36 is judged from the relation between the rotation angle of the nut and the tightening torque in the foregoing embodiment, the distance between the nut 36 and the externally threaded member 35 is usable instead of the rotation angle of the nut 36. Alternatively, both the rotation angle of the nut 36 and the distance between the nut 36 and the threaded member 35 may be used. The distance between the nut 36 and the threaded member 35 can be detected by a potentiometer, eddy current displacement sensor, laser-type displacement sensor or the like.

Although the tightening torque is detected by the strain gauge 18 in the foregoing embodiment, the torque is detectable by other means, for example, by a magnetostrictive torque sensor. The rotation angle can be detecting by suing a potentiometer to obtain an analog signal and converting the signal to an angle.

Figure 13:
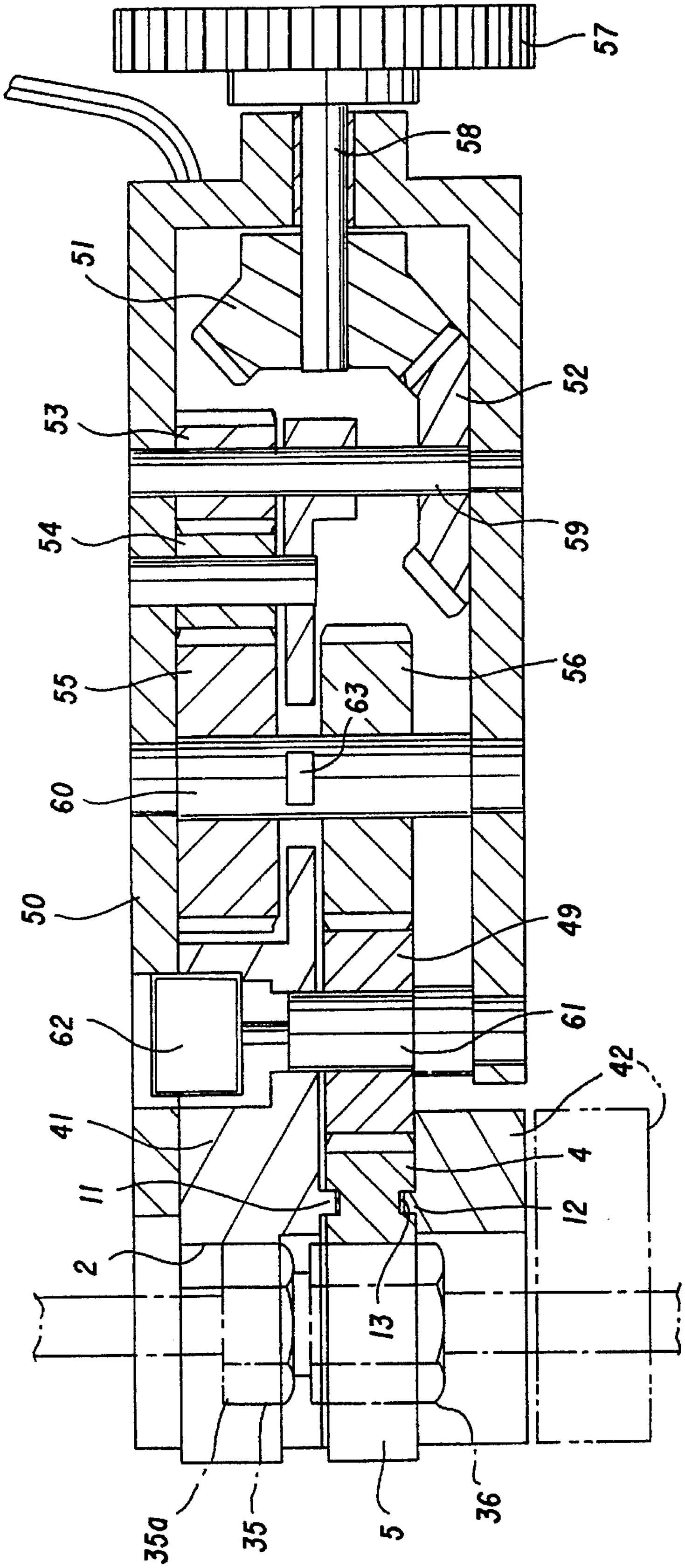
FIG. 13 is a view in vertical section showing another embodiment of tightening device for use in the threaded member tightening device of the invention.

FIGS. 13 to 15 shows a manual tightening device. Throughout the drawings showing the motor-driven and manual tightening devices, like parts are designated by like reference numerals.

A spur gear 49 for driving a nut tightening gear 4 is coupled by a train of gears to a handle 57 having a horizontal rotary shaft 58. More specifically, a bevel gear 51 mounted on the shaft 58 of the handle 57 is in mesh with a bevel gear 52 having a vertical rotary shaft 59, which is provided with a spur gear 53. The gear 53 is in mesh with a rotation direction changing spur gear 54, which in turn meshes with a reduction spur gear 55 mounted on a vertical rotary shaft 60. A spur gear 56 on the shaft 60 meshes with the spur gear 49 for driving the nut tightening gear 4.

The spur gear 49 for driving the gear 4 has a vertical rotary shaft 61, which has attached to its upper end a rotary encoder 62 for detecting the angle of rotation of a nut 36. A tightening torque detecting strain gauge 63 is attached to the vertical rotary shaft 60 of the reduction spur gear 55.

A lever 43 for moving a lower plate 42 upward and downward is movably supported by a pivot 44 on each of opposite sides of a body 50. The lever 43 has a front end fixed by a pin 48 to an upright portion **42*a* of the lower plate 42. The lever 43 is formed with a slot 45 having the pivot 44 fitted therein. The body 50 has a guide pin 46 projecting from each side thereof and positioned closer to its base end than the pivot 44. Each lever 43 is formed with a guide groove 47 for moving the lower plate upward and downward in a horizontal position. When the lower plate 42 is moved upward or downward by the pivotal movement of each lever 43, the guide pin 46 is guided by the groove 47, permitting the pivot 44 to move within the slot 45, whereby the lower plate 42** is allowed to remain in the horizontal position during the movement.

The nut 36 is tighened up by the manual device generally in the same manner as when the motor-driven device is used. Although it is difficult to manually control the speed of rotation of the nut with the manual device, the rotation angle, if not controlled, results in no objection. Since the nut 36 can not be stopped automatically and is not rotatably reversely automatically, the nut 36 is stopped when an indication of completion of acceptable tightening is given, and the tightening operation is discontinued and the nut 36 is manually rotated reversely when an alarm is given to indicate improper tightening.

Although the lower plates 3, 42 are made movable relative to the upper plates 1, 41 with the foregoing embodiments, they need not always be so movable. The gear 4 having the fitting portion and removably mountable may alternatively be fixed to the lower plate.

Figure 16:
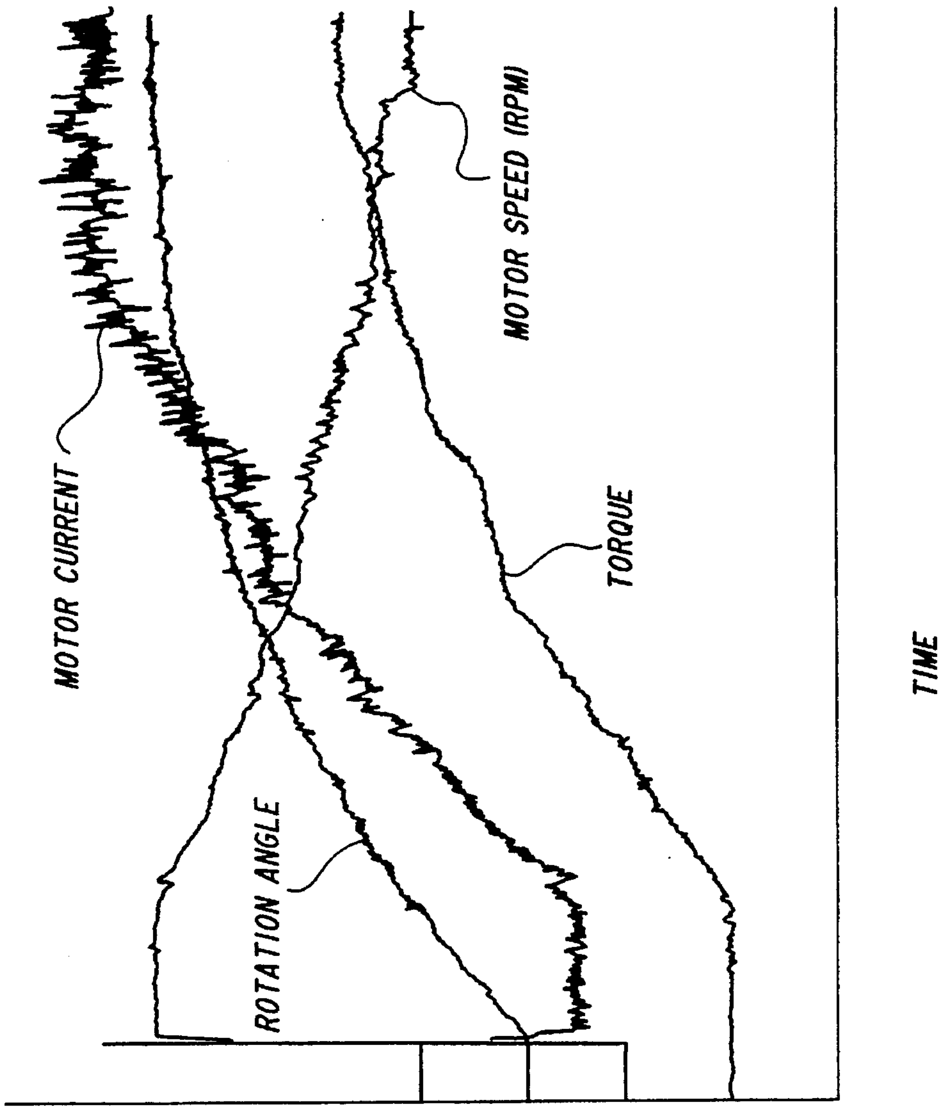
FIG. 16 is a graph showing variations in tightening torque, motor current, nut rotation angle and number of revolutions of motor with time in the case of normal tightening.
Figure 17:
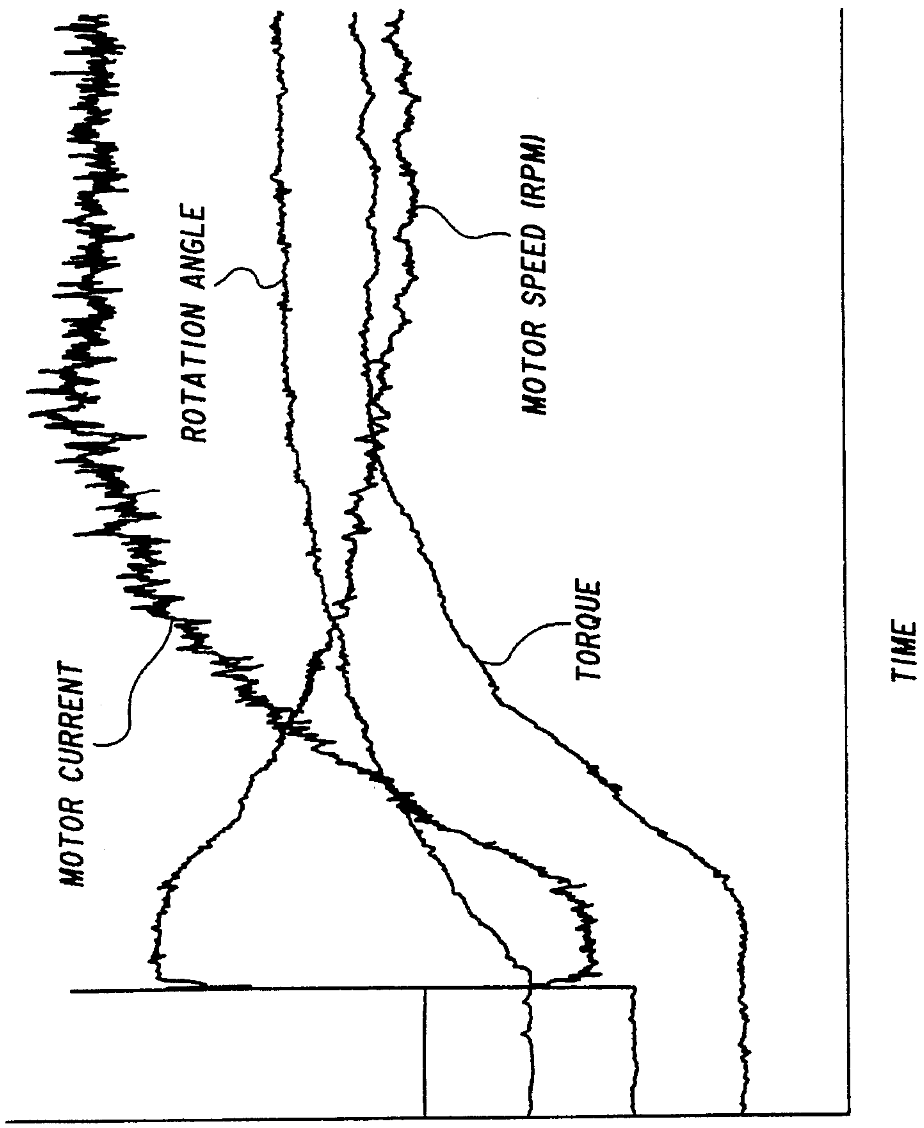
FIG. 17 is a graph showing variations in tightening torque, motor current, nut rotation angle and number of revolutions of motor with time in the case of abnormal tightening.
Figure 18:
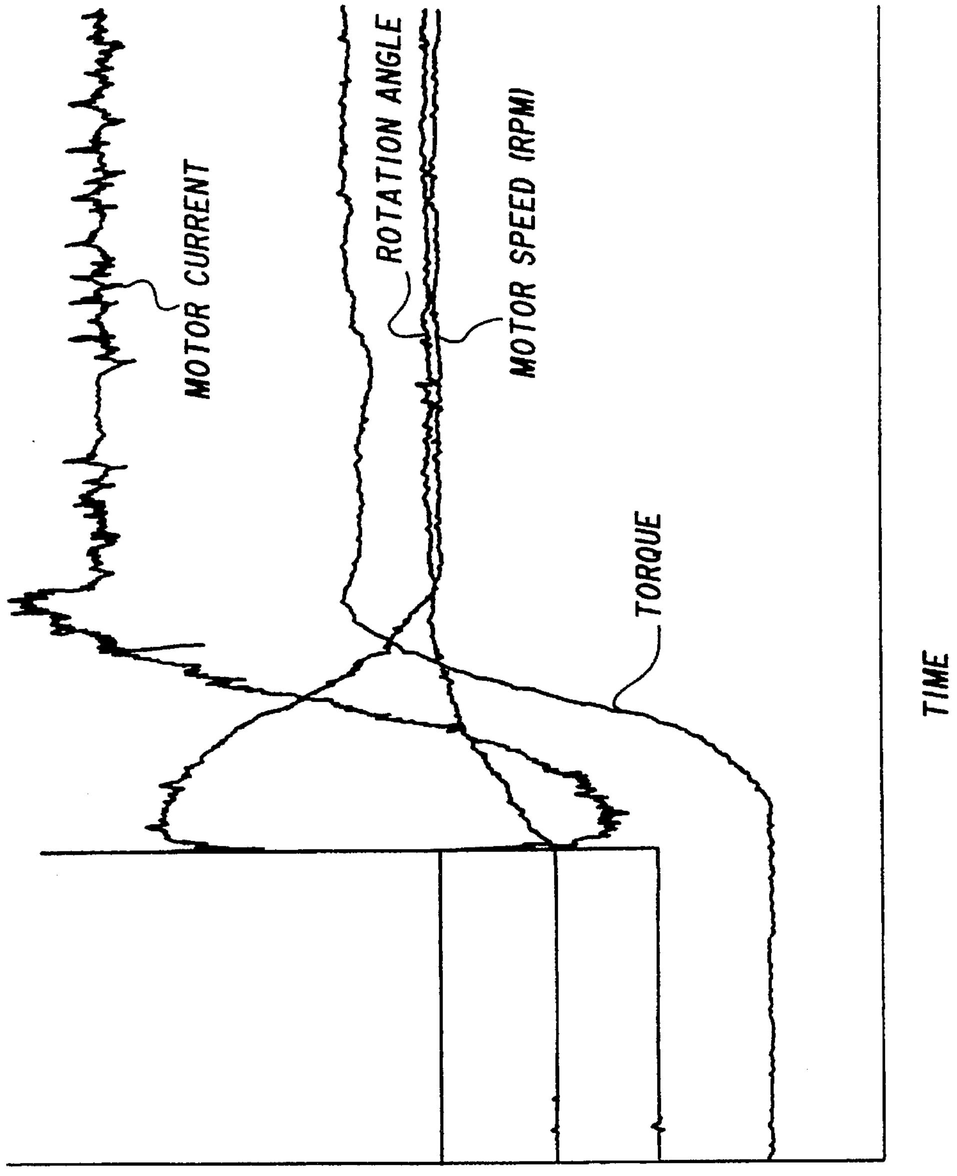
FIG. 18 is a graph showing variations in tightening torque, motor current, nut rotation angle and number of revolutions of motor with time in another case of abnormal tightening.

FIGS. 16 to 18 are graphs showing variations in tightening torque, motor current, angle of rotation of the nut and motor speed (number of revolutions) with time (tightening time). FIG. 16 shows a normal case of tightening, FIG. 17 a case wherein the gasket is absent, and FIG. 18 a case wherein both the gasket and thrust bearing are absent. When the motor is started, the rotation angle starts to increase, and a small period of time thereafter, the tightening torque and the motor current increase with a reduction in the motor speed. FIGS. 16 to 18 reveal that the torque curve and the motor current curve extend similarly with time regardless of whether tightening is effected normally or abnormally. This indicates that it is possible to use the motor rotation time instead of the rotation angle of the nut and to use the motor current value instead of the tightening torque in judging whether the nut is tightened normally.

More specifically, it is possible to make judgment of acceptable tightening when the motor current value is found to be within a specified range upon lapse of a predetermined period of time, or judgment of improper tightening if otherwise. This obviates the need for the strain gauge 18 and the rotation angle sensor 17 to make the tightening device simple in construction.

What is claimed is:

1. A method of tightening a threaded member, comprising the steps of:

tightening the threaded member while detecting an amount of tightening and a tightening torque; and judging whether the tightening torque is within a reference range relative to an amount of tightening, a reference range of tightening torques being predetermined relative to the amount of tightening of the threaded member as normally tightened, wherein the step of judging includes a step of determining acceptable reference ranges for at least an amount of tightening and tightening torques for in each incremental step of tightening, from a beginning to an end of the incremental step of tightening, the amount of tightening and the tightening torque being detected and whether a detected amount of tightening and a detected tightening torque fall within respective reference ranges being judges in each incremental step of tightening from the beginning to the end of the incremental step of tightening.

2. A method as defined in claim 1, wherein a rotation angle of the threaded member is used as the amount of tightening of the threaded member.

3. A method as defined in claim 1, wherein a displacement of the threaded member is used as the amount of tightening of the threaded member.

4. A method as defined in claim 1, wherein a value of tightening torque is used as a reference value of tightening torque.

5. A method as defined in claim 1, wherein a slope of tightening torque relative to the amount of tightening of the threaded member is used as a reference value of tightening torque.

6. A method as defined in claim 2, wherein said drive means includes a motor for tightening the threaded member, and a rotation angle of the threaded member is calculated from a rotation time of the motor.

7. A method as defined in claim 4, wherein said drive means includes a motor for tightening the threaded member, and the value of tightening torque, is calculated from the motor current.

8. A method as defined in claim 1, wherein the judgement is made more frequently at the beginning of the tightening than it is made in a latter half of tightening.

9. A method as defined in claim 1, wherein a speed of rotating the threaded member in a latter half of tightening is higher than a speed of rotating the threaded member at the beginning of tightening.

* * * * *